US012674496B2

(12) United States Patent
Thomas et al.

(10) Patent No.: US 12,674,496 B2
(45) Date of Patent: Jul. 7, 2026

(54) BRAKE ASSEMBLY

(71) Applicant: Meritor Heavy Vehicle Braking Systems (UK) Limited, Cwmbran (GB)

(72) Inventors: Paul Thomas, Cwmbran (GB); Sean Cleary, Cwmbran (GB); Daniel Jenkins, Cwmbran (GB); Simon Duggan, Cwmbran (GB); Rhys Watkins, Cwmbran (GB)

(73) Assignee: Meritor Heavy Vehicle Braking Systems (UK) Limited (GB)

( * ) Notice: Subject to any disclaimer, the term of this patent is extended or adjusted under 35 U.S.C. 154(b) by 363 days.

(21) Appl. No.: 17/698,533

(22) Filed: Mar. 18, 2022

(65) Prior Publication Data

US 2022/0299074 A1      Sep. 22, 2022

(30) Foreign Application Priority Data

Mar. 22, 2021    (EP) .................................... 21164067

(51) Int. Cl.
    *F16D 65/00*        (2006.01)
    *F16D 55/227*       (2006.01)
(52) U.S. Cl.
    CPC ....... *F16D 65/0006* (2013.01); *F16D 55/227* (2013.01); *F16D 65/005* (2013.01)
(58) Field of Classification Search
    CPC ... F16D 65/0006; F16D 65/005; F16D 55/227
    USPC ................................ 188/73.37, 73.44, 73.45
    See application file for complete search history.

(56) References Cited

U.S. PATENT DOCUMENTS

| | | | | | |
|---|---|---|---|---|---|
| 4,781,273 | A | * | 11/1988 | Fujinami | B61H 5/00 |
| | | | | | 188/73.45 |
| 8,944,221 | B2 | * | 2/2015 | Pericevic | F16D 65/54 |
| | | | | | 188/73.44 |
| 9,816,577 | B2 | * | 11/2017 | Fischer | F16D 55/22655 |
| 10,280,992 | B2 | * | 5/2019 | Fischer | F16D 55/227 |

FOREIGN PATENT DOCUMENTS

| | | | | | |
|---|---|---|---|---|---|
| AT | 392524 | B | * | 4/1991 | |
| CN | 112601900 | A | * | 4/2021 | ....... F16D 55/22655 |
| DE | 27 22 620 | A1 | | 11/1978 | |
| DE | 3120685 | A1 | * | 6/1983 | |
| DE | 41 19 928 | A1 | | 12/1992 | |
| DE | 102009039108 | A1 | * | 3/2011 | ........... F16D 27/112 |
| EP | 0068613 | A3 | * | 2/1983 | |
| EP | 3 193 035 | A1 | | 7/2017 | |
| EP | 3 296 585 | A1 | | 3/2018 | |
| WO | WO-8803614 | A1 | * | 5/1988 | |

OTHER PUBLICATIONS

Extended European Search Report dated Sep. 12, 2022 for related European Appn No. 22163493.4; 8 Pages.
Extended European Search Report dated Sep. 6, 2021 for related application No. 21164067.7; 7 pages.

* cited by examiner

*Primary Examiner* — Robert A. Siconolfi
*Assistant Examiner* — Mahbubur Rashid
(74) *Attorney, Agent, or Firm* — Dickinson Wright PLLC

(57) ABSTRACT

A brake assembly that includes a caliper that has a guide bore, a brake carrier, a guide pin having a guide sleeve, and a lock arrangement. The lock arrangement has a friction element and is operable to selectively apply a force to the friction element to increase friction between the guide sleeve and the guide bore and inhibit relative sliding between the caliper and the brake carrier.

19 Claims, 8 Drawing Sheets

128 a 126 a

142

BRAKE ASSEMBLY

TECHNICAL FIELD

The present teachings relate to a brake assembly for a heavy commercial vehicle.

BACKGROUND

Commonly, air-actuated heavy-vehicle disc brakes include a brake carrier, a brake caliper, an inboard brake pad and an outboard brake pad. In use, the brake carrier straddles a brake rotor and the brake pads are positioned on opposing sides of said brake rotor. Typically, the brake caliper is arranged to freely slide on guide pins relative to the brake carrier, and the brake pads are secured to the brake caliper. As such, during a braking operation, under the action of a brake actuator, the brake pads can move relative to the brake carrier, such that friction material on each brake pad contacts the brake rotor.

Outside of a braking operation, the brake actuator is released, and the brake pads are typically 'pushed' away from the rotor back to a rest position due to the rotor being slightly uneven or having a degree of runout. However, during normal use of the vehicle, at least one of the brake pads may contact the brake rotor unintentionally. Such unintentional contact between the brake pads and the brake rotor may be caused by, for example, engine vibration or cornering forces. Contact between the brake rotor and the brake pads outside of a braking operation can lead to lower vehicle efficiency and higher fuel consumption, as well as reducing the life of the brake pads due to increased wear of the friction material.

Existing systems for positive pad retraction can help to ensure that the brake pads are pushed away from the rotor after a brake operation, but they are typically located in an intermediate position between the inboard and outboard brake pads so cannot account for differential brake pad and rotor wear, when the inboard and outboard brake pads, and opposite surfaces of the rotor, wear at different rates. Such positive pad retraction systems are also difficult to align and locate, due to, for example, machining tolerances.

The present teachings seek to overcome, or at least mitigate the problems of the prior art.

SUMMARY

A first aspect of the invention provides a brake assembly for a heavy commercial vehicle. The brake assembly comprises: a caliper comprising a guide bore; a brake carrier arranged to receive a brake pad; a guide pin comprising a guide sleeve secured to the brake carrier, the guide pin defining an axial direction and being received within the guide bore of the caliper such that the caliper is slidable relative to the brake carrier along the guide sleeve; and a lock arrangement at least partially interposed between the guide bore and the guide sleeve, the lock arrangement comprising a friction element.

The lock arrangement is operable to selectively apply a force to the friction element in order to increase friction between the guide sleeve and the guide bore and inhibit relative sliding between the caliper and the brake carrier.

Advantageously, since the lock arrangement is operable to inhibit relative sliding between the caliper and the brake carrier, the lock arrangement may be used to stop the caliper sliding relative to the brake carrier outside of a braking operation when there is a desired running clearance between each brake pad and a brake rotor. As such, the lock arrangement can help to prevent the brake pads from contacting the brake rotor unintentionally. Moreover, when the lock arrangement is operated to inhibit relative sliding between the caliper and the brake carrier, the lock arrangement may also act to dampen undesirable vibrational effects, such as a rattling sound caused by the guide pin abutting against the caliper due to engine vibration for example.

The friction element may be configured to be deformed by the force applied by the lock arrangement. The friction element may be configured to be compressed in the axial direction and expanded in a radial direction by the force applied by the lock arrangement.

As the friction element is located between the guide bore and guide sleeve, expansion in the radial direction will increase the friction between the guide bore and guide sleeve.

The friction element may have a cross-sectional area, and the cross-sectional area may remain constant as the friction element is deformed.

As the cross-sectional area remains constant, compressing the friction element in the axial direction will inevitably result in an expansion in the radial direction.

The lock arrangement may comprise a retaining cage that houses the friction element. The retaining cage may comprise an axially fixed element and an axially movable element. The friction element may be located between the axially fixed element and the axially movable element such that when the lock arrangement is operated, the axially movable element is moved towards the axially fixed element to apply the force to the friction element.

The lock arrangement is a contained system that can be easily retrofitted to existing brake assemblies. As there is only a single moving part, the arrangement is reliable and simple to manufacture.

The retaining cage, axially movable element, axially fixed element, and the friction element may all be annular. In alternative embodiments, only some of the retaining cage, axially movable element, axially fixed element, and the friction element may be annular.

The annular shape enables the lock arrangement to be located in an annular space between the guide sleeve and guide bore, which is an efficient use of space with the brake assembly.

The axially movable element may have a radially inner thread that engages a radially outer thread of the guide sleeve such that rotation of the axially movable element results in movement of the axially movable element relative to the guide sleeve.

Selective rotation of the axially movable element can be easily achieved in any suitable way, such as a servo motor in communication with the axially movable element. As rotation can be translated into an axial movement, the space required for an actuating arrangement can be minimized.

The axially fixed element may be axially fixed relative to the guide sleeve.

As the axially fixed element is fixed relative to the guide sleeve, movement of the axially movable element relative to the guide sleeve moves the axially movable element towards the axially fixed element.

The retaining cage may have a low-friction radially outer surface.

Therefore, when the lock arrangement is not operated, relative sliding of the guide bore and lock arrangement is not inhibited.

The retaining cage may comprise one or more cut-outs to enable the friction element to expand radially outwardly through the one or more cut-outs. The retaining cage may comprise at least two circumferentially distributed cut-outs.

This enables the friction element to come into contact with the surface of the caliper bore to increase friction and inhibit relative sliding of the caliper and brake carrier.

A gap may be defined between the axially fixed element and the axially movable element. The gap may locate the frictional element. The axially fixed element and the axially movable element may have opposing angled end faces such that gap tapers outwardly in the radially outward direction.

The outward tapering of the gap helps to ensure that the friction element expands radially outwardly when the force is applied to the friction element.

The friction element may be an annular resilient element. The annular resilient element may be an o-ring.

Such a friction element is low-cost, reliable, and easily available, aiding manufacture and maintenance.

The friction element may be configured to be moved in a radial direction by the force applied by the lock arrangement.

As an alternative, by moving the friction element in a radial direction, friction between the guide sleeve and guide bore can be increased, inhibiting movement of the caliper and brake carrier.

The lock arrangement may comprise a retaining cage that houses the friction element. The retaining cage may comprise an axially fixed element and an axially movable element. The friction element may be located between the axially fixed element and the axially movable element such that when the lock arrangement is operated, the axially movable element is moved towards the axially fixed element to apply the force to the friction element.

The lock arrangement is a contained system that can be easily retrofitted to existing brake assemblies. As there is only a single moving part, the arrangement is reliable and simple to manufacture.

The retaining cage, axially movable element, axially fixed element, and the friction element may all be annular. In alternative embodiments, only some of the retaining cage, axially movable element, axially fixed element, and the friction element may be annular.

The annular shape enables the lock arrangement to be located in an annular space between the guide sleeve and guide bore, which is an efficient use of space with the brake assembly.

The axially movable element may have a radially inner thread that engages a radially outer thread of the guide sleeve such that rotation of the axially movable element results in movement of the axially movable element relative to the guide sleeve.

Selective rotation of the axially movable element can be easily achieved in any suitable way, such as a servo motor in communication with the axially movable element. As rotation can be translated into an axial movement, the space required for an actuating arrangement can be minimized.

The axially fixed element may be axially fixed relative to the guide sleeve.

As the axially fixed element is fixed relative to the guide sleeve, movement of the axially movable element relative to the guide sleeve moves the axially movable element towards the axially fixed element.

The retaining cage may have a low-friction radially outer surface.

Therefore, when the lock arrangement is not operated, relative sliding of the guide bore and lock arrangement is not inhibited.

The retaining cage may comprise one or more cut-outs to retain the friction element and allow the friction element to move radially outwardly through the one or more cut-outs. The retaining cage may comprise at least two circumferentially distributed cut-outs.

This enables the friction element to come into contact with the surface of the caliper bore to increase friction and inhibit relative sliding of the caliper and brake carrier.

A gap may be defined between the axially fixed element and the axially movable element. The gap may locate the frictional element. The axially fixed element and the axially movable element may have opposing angled end faces such that gap tapers outwardly in the radially outward direction.

The outward tapering of the gap helps to ensure that the friction element is moved radially outwardly when the force is applied to the friction element.

BRIEF DESCRIPTION OF THE DRAWINGS

Embodiments are now disclosed by way of example only with reference to the drawings, in which.

DETAILED DESCRIPTION

Figure 1:
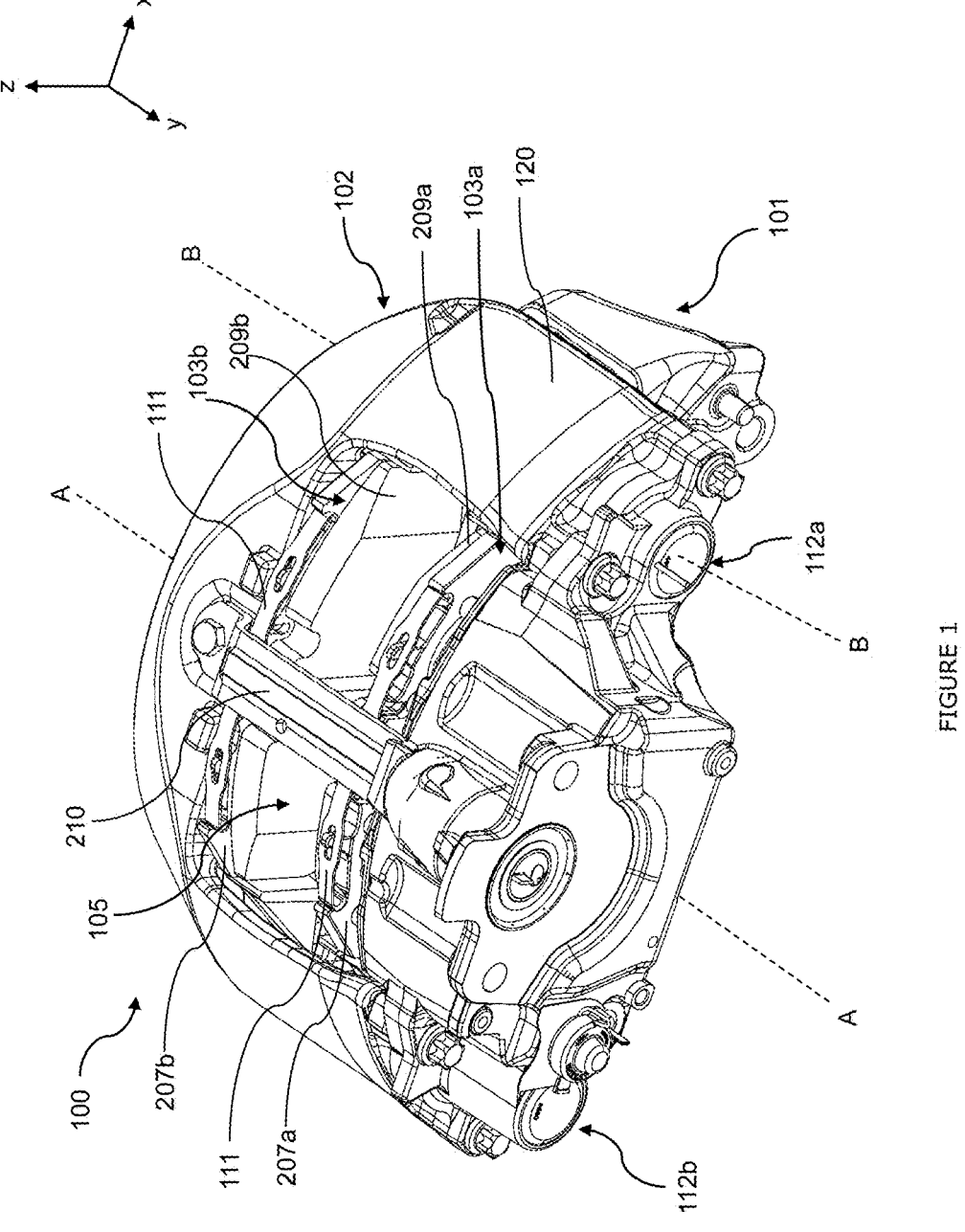
FIG. 1 is a perspective view of a brake assembly according to a first embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1 to 8 show a disc brake assembly 100 for a heavy commercial vehicle according to a first embodiment. The disc brake assembly 100 includes a caliper 102 slidably mounted with respect to a brake carrier 101 by two guide assemblies 112a and 112b. The caliper 102 has a housing 120 typically formed from cast iron or steel. The carrier 101 is typically also formed from cast iron or steel.

The brake carrier 101 carries an inboard brake pad 103a and an outboard brake pad 103b.

A rotor (not shown), rotatable about an axis extending in an axial direction A-A, is rotationally fixed relative to a hub of a wheel of the vehicle (not shown) and positioned between the brake pads 103a, 103b. An air actuator (not shown) is provided to move the inboard brake pad 103a into frictional contact with the rotor via an actuation mechanism 122 (see FIG. 2) housed within the caliper housing 120 and which acts on the inboard brake pad 103a.

In alternative embodiments (not shown), the brake carrier 101 may only receive one of the inboard brake pad 103a or the outboard brake pad 103b. For example, the outboard brake pad 103b may be received in the caliper 102.

The inboard brake pad 103a includes a backplate 207a that supports friction material 209a which is mounted to the backplate 207a. The outboard brake pad 103b includes a backplate 207b that supports friction material 209b which is mounted to the backplate 207b.

During a braking operation, when the inboard brake pad 103a is pushed towards and contacts the rotor, the caliper 102 is then caused to slide inboard along first and second caliper guide assemblies 112a and 112b.

As the caliper 102 slides inboard, it moves the outboard brake pad 103b towards the rotor. Hence, the rotor becomes clamped between the inboard and outboard brake pads 103a, 103b and the rotation of the rotor is frictionally inhibited.

The caliper 102 defines an aperture 105 arranged to receive the brake carrier 101 and the brake pads 103a, 103b as shown in FIG. 1. Advantageously, the aperture 105 enables the inboard brake pad 103a and the outboard brake pad 103b to be installed and removed in a radial direction, with the rotor in place.

During a braking operation, it is desirable for the inboard brake pad 103a and the outboard brake pad 103b to be located equidistant from the rotor, to help ensure that the inboard brake pad 103a and the outboard brake pad 103b and both sides of the rotor wear as evenly as possible over the life of the disc brake assembly 100.

As the friction material 209a of the inboard brake pad 103a, the friction material 209b of the outboard brake pad 103b and the rotor wear over the life of the disc brake assembly 100, an adjustment mechanism (well-known and not described in detail) is configured to advance the inboard brake pad 103a towards the rotor during a braking operation if the clearance between the inboard brake pad 103a and the rotor is greater than desired. The adjustment occurs until the friction material 209a of the inboard brake pad 103a contacts the surface of the rotor, at which point the adjustment is stopped.

When the disc brake assembly 100 is released at the end of the braking operation, the inboard brake pad 103a and the outboard brake pad 103b move away from the rotor, such that there is an inboard pad clearance and an outboard pad clearance.

As will be described in more detail below, in this embodiment, the disc brake assembly 100 includes a lock arrangement 142 which helps to maintain the inboard pad clearance and the outboard pad clearance outside of a braking operation by inhibiting relative movement between the caliper 102 and the brake carrier 101, which inhibits relative movement between the inboard brake pad 103a, the outboard brake pad 103b and the rotor.

A pad strap 210 is arranged to extend over the aperture 105 in the axial direction (i.e., in a direction parallel to axis A-A) to help retain the inboard brake pad 103a and the outboard brake pad 103b, but other known retention arrangements may be used. In this embodiment, the pad strap 210 is fixed to the housing 120 at the inboard side of the disc brake assembly 100 and can be bolted to the caliper 102 at the outboard side of the disc brake assembly 100 to retain the inboard brake pad 103a and the outboard brake pad 103b. Due to the aperture 105, the inboard brake pad 103a and the outboard brake pad 103b can be assembled in the disc brake assembly 100 in a radial direction relative to the rotor. For example, this enables the inboard brake pad 103a and the outboard brake pad 103b to be removed and replaced when fully worn without the disc brake assembly 100 being disassembled and/or the rotor being removed.

The inboard brake pad 103a further comprises a pad spring 111 arranged between the backplate 207a of the inboard brake pad 103a and the pad strap 210. Specifically, the backplate 207a of the inboard brake pad 103a includes radially extending projections that engage corresponding recesses in the pad spring 111.

The outboard brake pad 103b further comprises a pad spring 111 arranged between the backplate 207b of the outboard brake pad 103b and the pad strap 110. The backplate 207b of the outboard brake pad 103b includes radially extending projections that engage corresponding recesses in the pad spring 111.

The pad springs 111 act to help bias the inboard brake pad 103a and the outboard brake pad 103b in the radial inward direction and help to dampen their movement, to help prevent rattling of the components in use. In other embodiments, other known biasing arrangements may be utilized.

The second guide assembly 112b is a conventional guide assembly known in the art. Typically, the second guide assembly 112b is longer than the first guide assembly 112a.

Figure 2:
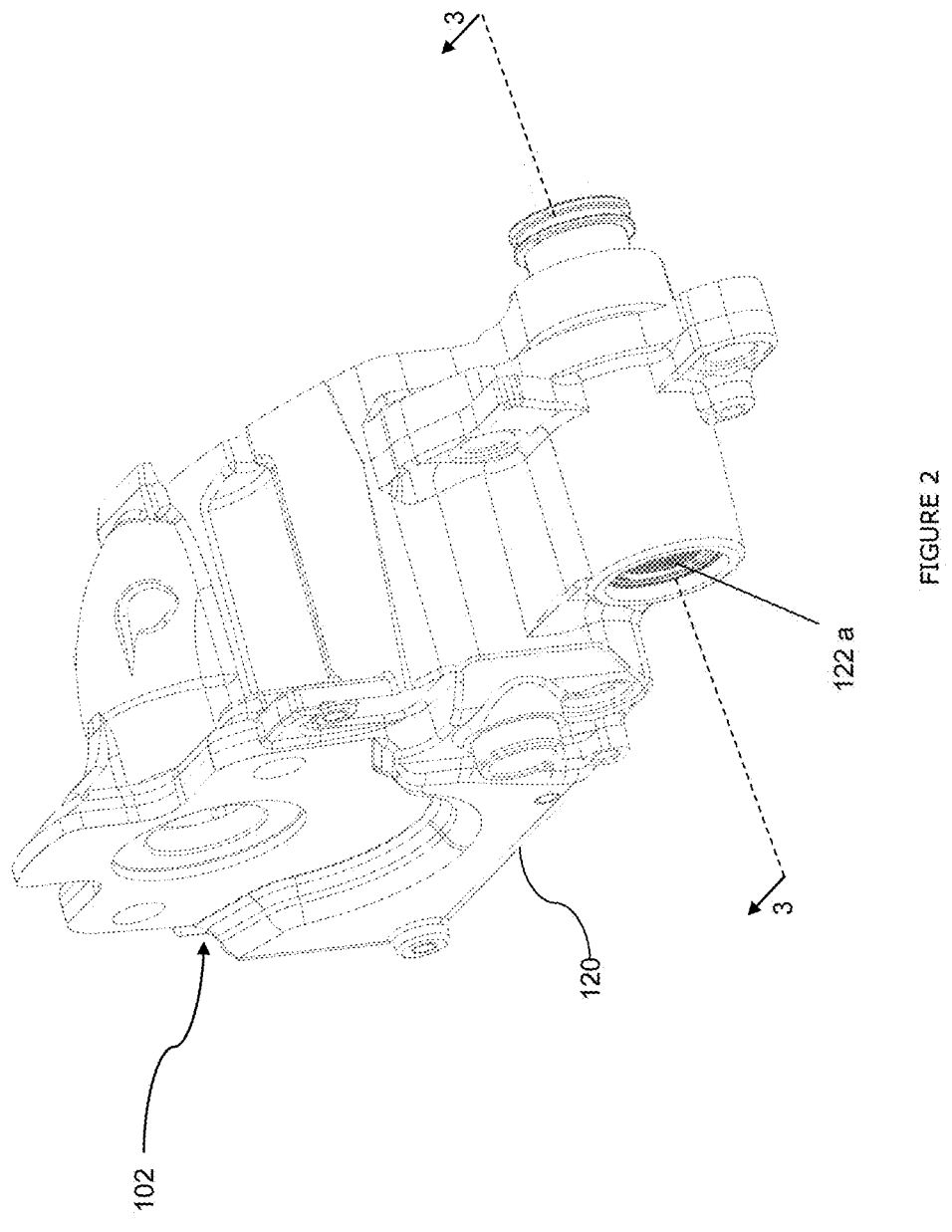
FIG. 2 is a close up-view of the caliper housing and guide bore of the brake assembly of FIG. 1.
Figure 3:
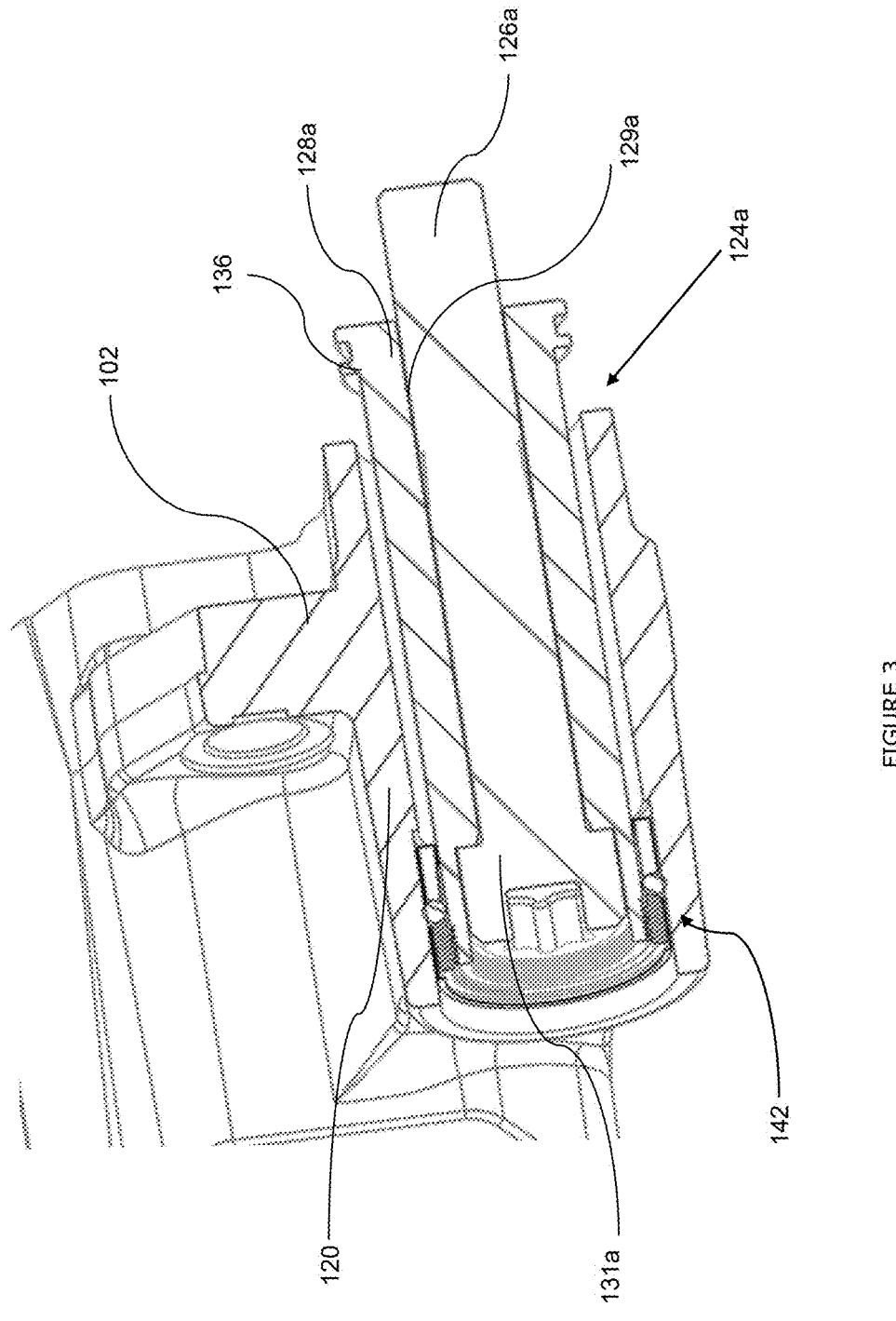
FIG. 3 is a partial cross-sectional view of the close-up view of FIG. 2 in the plane 3-3.
Figure 4:
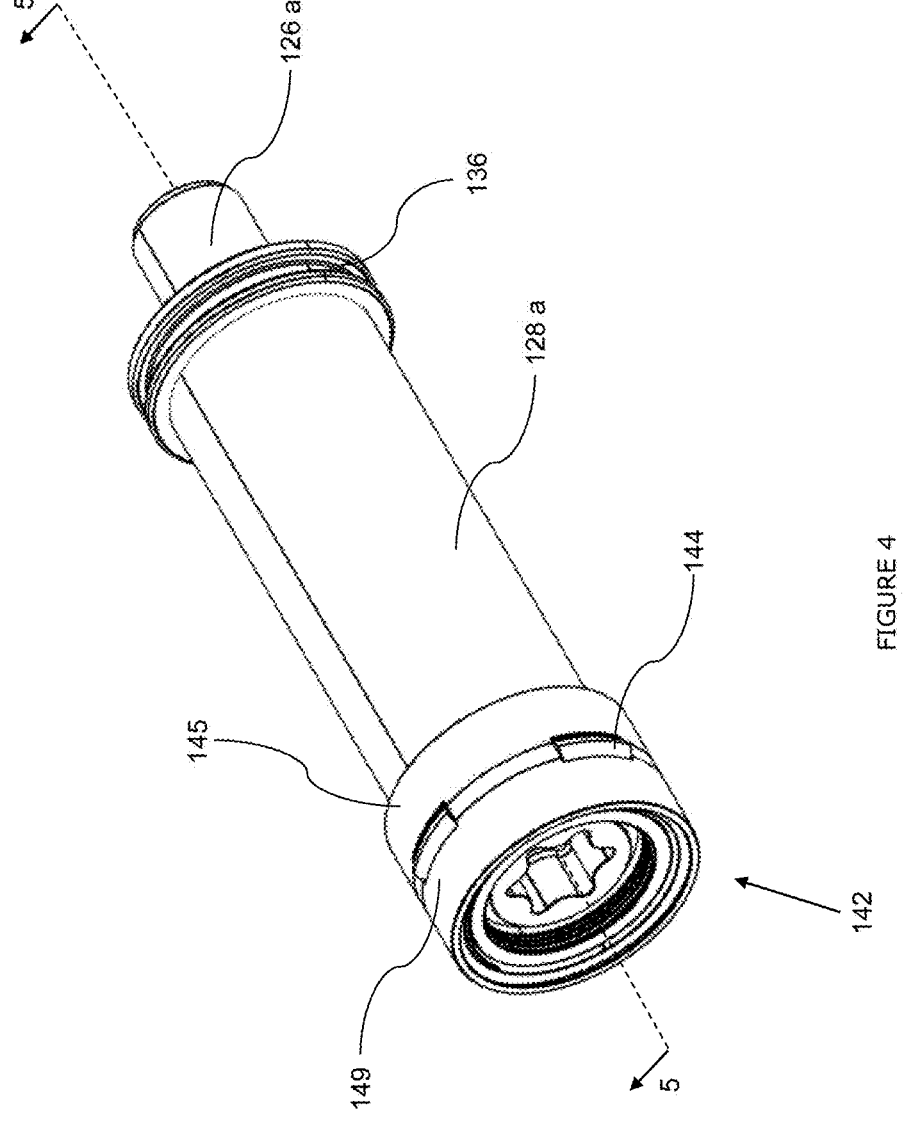
FIG. 4 is a perspective view of a guide pin assembly and lock arrangement of the brake assembly of FIG. 1.
Figure 5:
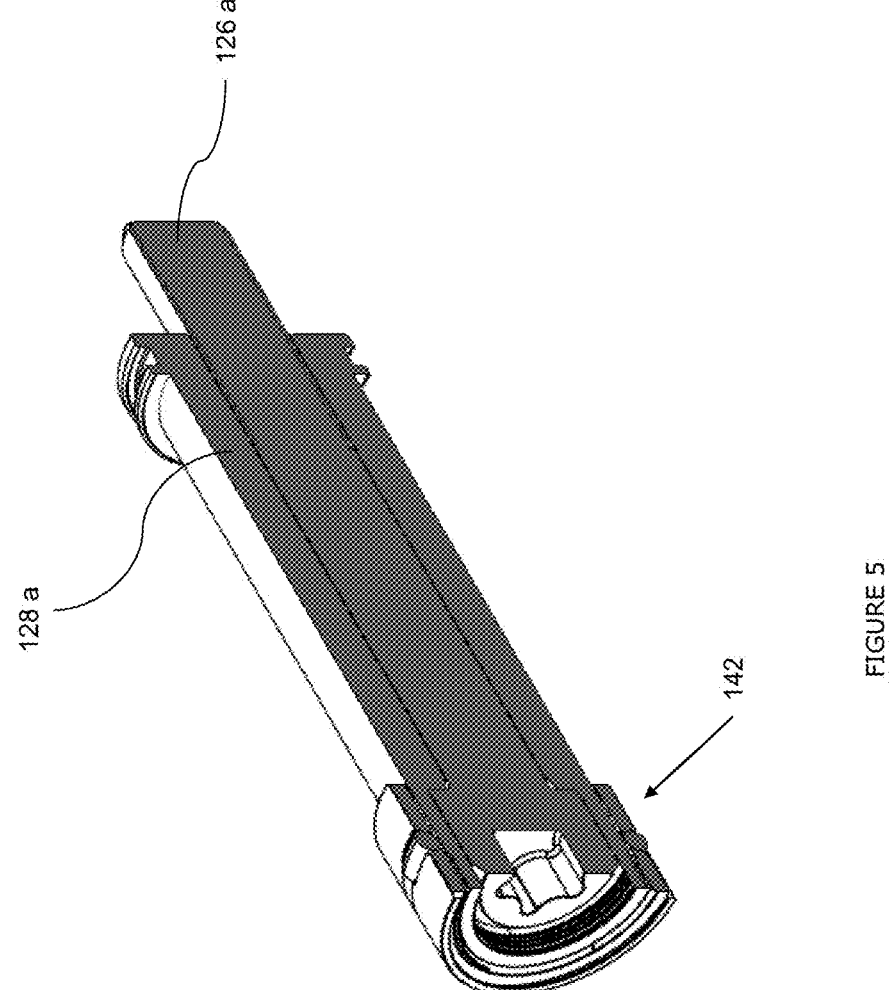
FIG. 5 is a partial cross-sectional view of the guide pin assembly and lock arrangement of FIG. 4 along the plane 5-5.
Figure 6:
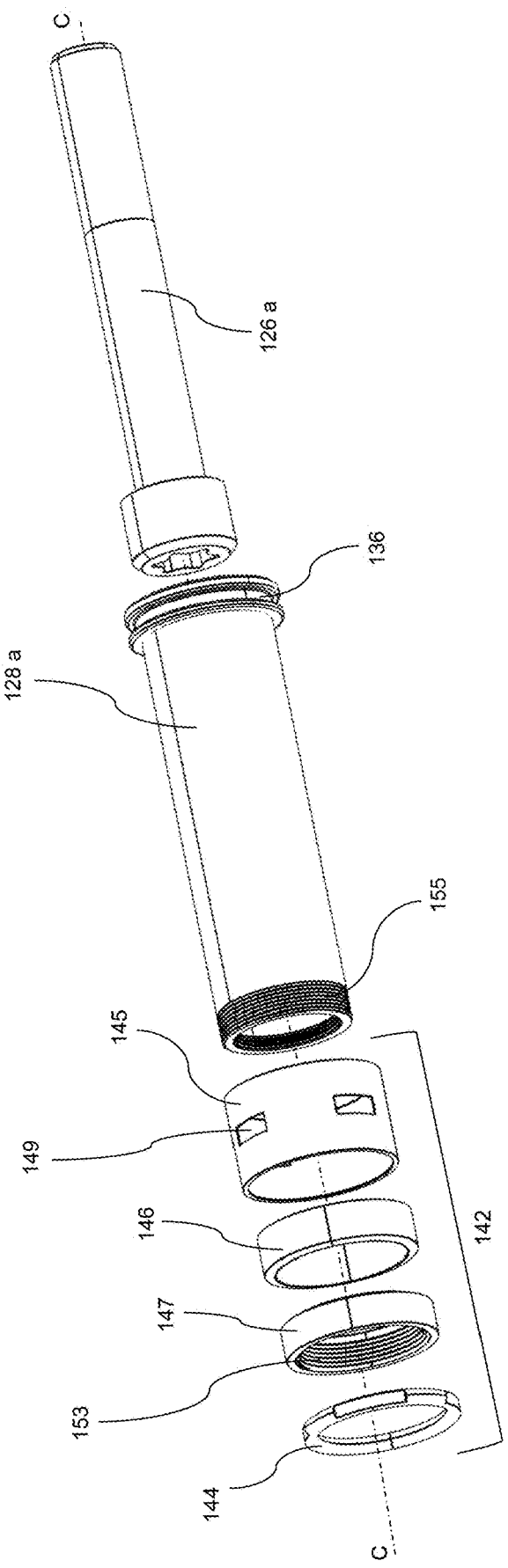
FIG. 6 is an expanded view of the guide pin assembly and lock arrangement of FIG. 4.
Figure 7:
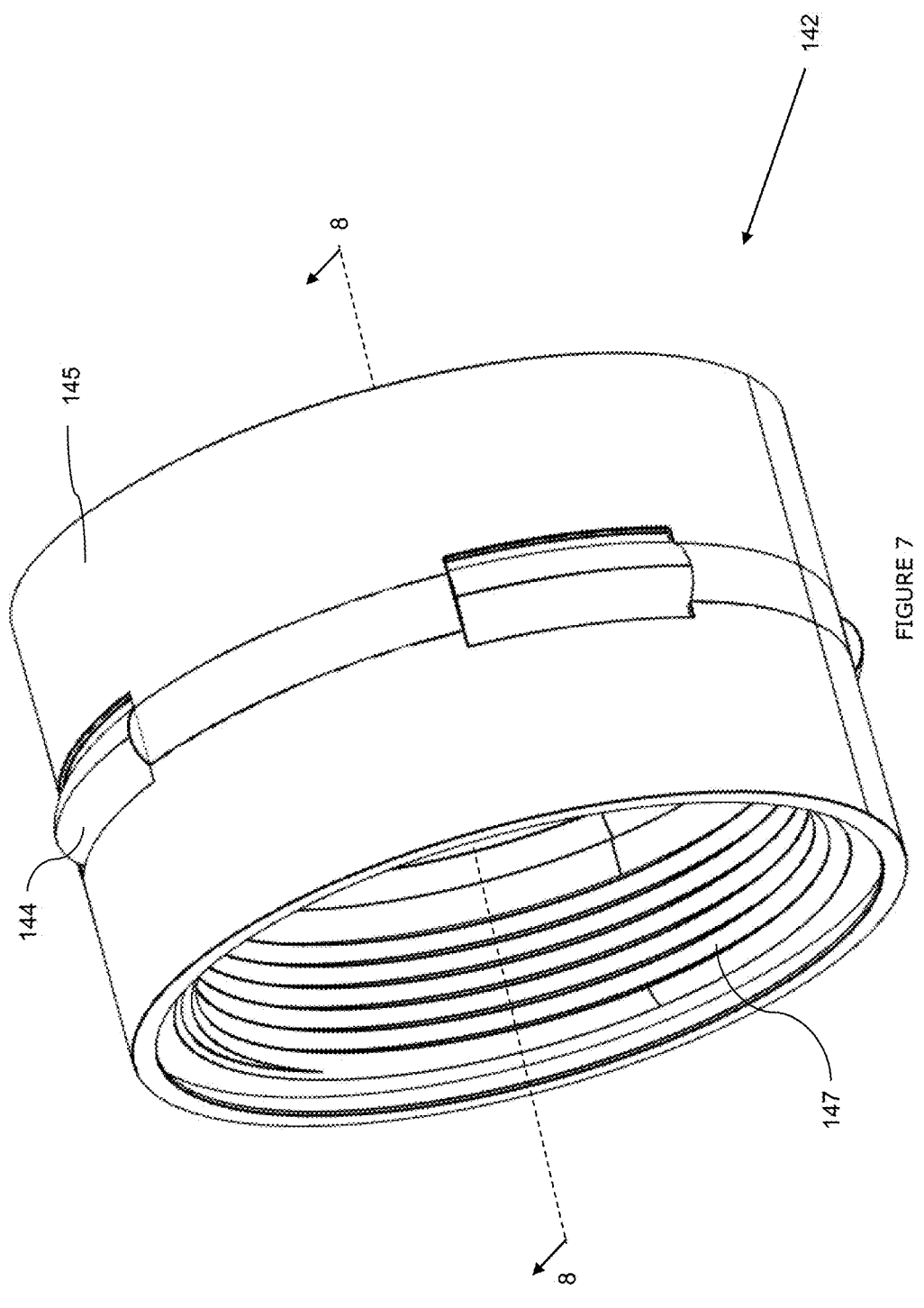
FIG. 7 is a perspective view of the lock arrangement of FIG. 4.
Figure 8:
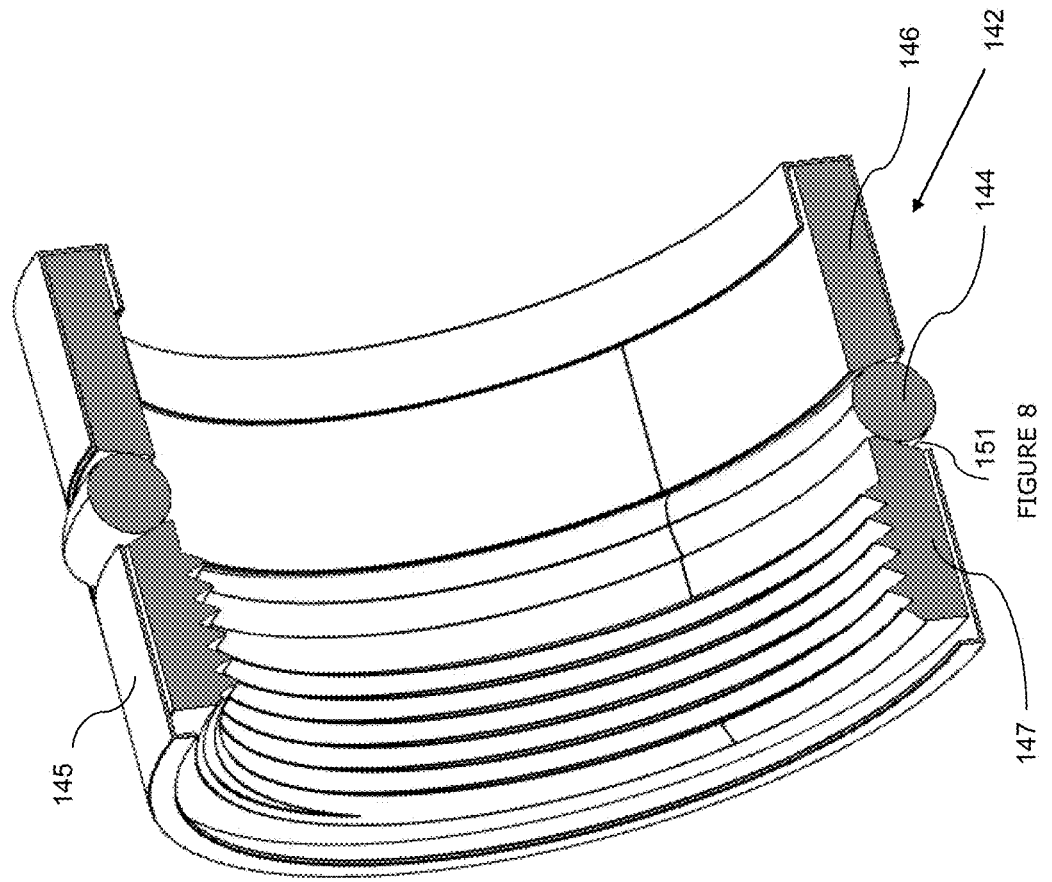
FIG. 8 is a partial cross-sectional view of the lock arrangement of FIG. 7 along the plane 8-8.

With reference to FIGS. 1, 2 and 3, the first guide assembly 112a comprises a bore 122a extending through the caliper housing 120 along an axis B-B, which is parallel to axis A-A. Hereinafter, any direction which is parallel to axis A-A shall be referred to as the axial direction. The bore 122a has a circular cross-sectional profile and receives a guide pin 124a with a circular outer profile.

The guide pin 124a comprises a fastener 126a to secure the guide pin 124a to the brake carrier 101. In the illustrated embodiment, the fastener 126a is a bolt that affixes to the brake carrier 101 by screwing into a threaded bore in the brake carrier 101.

The guide pin 124a further comprises a guide sleeve 128a substantially surrounding the fastener 126a. The sleeve 128a is a hollow tube with a substantially circular cross-sectional profile. The sleeve 128a includes a central bore 129a within which the fastener 126a is received. A head portion 131a of the central bore 129a is stepped so that the fastener 126a is able to hold the sleeve 128a in place when tightened on to the carrier 101.

The bore 122a of the first guide assembly 112a is an elongate hole extending from a first (inboard) side 130 to a second (outboard) side 132 of the caliper housing 120. The caliper 102 is slidably mounted with respect to the brake carrier 101 by sliding the guide pin 124a through the bore 122a. Hence, when the disc brake is actuated, the caliper 102 is able to slide in the axial direction A-A along the guide pin 124a.

The outboard end of the guide sleeve 128a includes a channel for fixing a convoluted bellows-type seal (not shown) that encircles the guide pin 124a and connects to the carrier 101 and caliper 102 to protect the guide assembly 112a from contamination.

In order to further inhibit the contamination of the caliper guide assembly 112a with foreign matter, a cap or cover, which is arranged to close an opening of the guide bore 122a, is secured to the inboard end of the bore 122a. The cap is formed from metal and press fitted into the end of the bore 122a. However, in alternative embodiments (not shown), the cap may be partially or wholly formed from a different material such as a plastics material for example.

As shown in FIGS. 3 to 8, a lock arrangement 142 is located within the bore 122a. The lock arrangement 142 is operable to inhibit relative sliding between the caliper 102 and the brake carrier 101.

As will become apparent below, the lock arrangement 142 may be used to inhibit relative sliding between the caliper 102 and the carrier 101 once the inboard brake pad 103a and the outboard brake pad 103b are spaced from the rotor. Preferably, the lock arrangement 142 may be used to inhibit relative sliding between the caliper 102 and the carrier 101 once the inboard brake pad 103a and the outboard brake pad 103b are located equidistant from the rotor.

The lock arrangement 142 is interposed between the guide bore 122a and the guide sleeve 128a. In this embodiment, as shown in more detail in FIGS. 6 to 8, the lock arrangement 142 includes a friction element 144, a retaining cage 145, an axially fixed element 146 and an axially movable element 147. In this embodiment, the friction element 144, the retaining cage 145, the axially fixed element 146 and the axially movable element 147 are all annular and locate on the guide sleeve 128a in an annular space defined between the guide sleeve 128a and the internal surface of the guide bore 122a.

The retaining cage 145 houses the friction element 144, the axially fixed element 146 and the axially movable element 147. In this embodiment, the retaining cage 145 is shaped from a sheet material, such as sheet metal. As shown most clearly in FIG. 8, at both axial ends, the sheet material is bent radially inwardly to form lips that help to axially retain the components housed in the retaining cage 145. The retaining cage 145 has a radially outer surface that is low-friction. The friction should be low enough that when the lock arrangement 142 is not operated, relative sliding of the guide bore 122a and the lock arrangement 142 is not inhibited. The radially outer surface includes, in this embodiment, a plurality of circumferentially distributed cut-outs 149. In this embodiment, each cut-out 149 is rectangular in shape, and there are four cut-outs 149 in total. However, it will be appreciated that a range of shapes and number of cut-outs 149 could be included. As described in more detail below, the cut-outs 149 line-up with the friction element 144 and enable the friction element 144 to project radially through the retaining cage 145. In alternative embodiments, the retaining cage 145 could be formed in any other suitable way. For example, the retaining cage 145 could be formed of a plastics material in an injection molding process.

The axially fixed element 146 is, in this embodiment, a metal ring, but could be formed of any suitable material. The axially fixed element 146 is axially fixed relative to the guide sleeve 128a. In this embodiment, the bent-over lip at the outboard end of the retaining cage 145 is an interference fit with the guide sleeve 128a. As the axially fixed element 146 is retained by this bent-over lip, it is axially fixed relative to the guide sleeve 128a. In alternative embodiments, the axially fixed element 146 could contact the guide sleeve 128 directly. Further, rather than an interference fit, the axially fixed element 146 could be axially retained with a suitable mechanical fastener, e.g., a retaining ring such as a circlip, or fixed in place with an adhesive or welding process. The axially fixed element 146 could even be integrally formed with the guide sleeve 128a. In this embodiment, the axially fixed element 146 has an inboard end surface that is angled relative to the radial direction.

The axially movable element 147 is, in this embodiment, also a metal ring, but could be formed of any suitable material. The axially movable element 147 has a radially inner thread 153 that engages a radially outer thread 155 on the guide sleeve 128a. Therefore, rotation of the axially movable element 147 results in axial movement of the axially movable element 147 relative to the guide sleeve 128a. Although not shown in the figures, rotation of the axially movable element 147 can be triggered by any suitable arrangement. As rotation is translated into an axial movement, a compact arrangement can be used, which is advantageous in a brake assembly where there are significant packaging constraints. For example, an electric servo motor could be fitted to the brake assembly and be in communication with the axially movable element 147. In this embodiment, the radial outer surface of the axially movable element is spaced from the inner surface of the retaining cage 145 such that the axially movable element is also free to move axially relative to the retaining cage 145. The axially movable element 147 is retained within the cage by the lip at the inboard end of the retaining cage 145. The axially movable element 147 has an outboard end surface that is angled relative to the radial direction and opposes the inboard end surface of the axially fixed element 146.

A gap 151 is defined between the opposing angled end surfaces of the axially fixed element 146 and the axially movable element 147. In this embodiment, the gap 151 tapers outwardly in the radial direction. The gap locates the frictional element 144.

In this embodiment, the frictional element 144 is resilient. In this embodiment, the frictional element 144 is formed from an elastically deformable material such as rubber or a plastics material. Specifically, in this embodiment, the frictional element 144 is an o-ring with a constant circular cross-section. As will be appreciated, as the axially movable element 147 is rotated and moved axially relative to the guide sleeve 128a, it applies a force to the friction element 144. The axially fixed element 146 cannot move relative to the guide sleeve 128a so applies a reaction force to the friction element 144. The frictional element 144 is solid and formed such that when the force is applied, its volume will remain constant. Due to the constraints formed by the axially movable element 147 and the axially fixed element 146, the frictional element 144 deforms elastically. More specifically, as the frictional element 144 is compressed in the axial direction, it expands in the radial direction. The total cross-sectional area of the frictional element 144 remains constant, but the cross-sectional shape of the frictional element 144 changes. In this embodiment, due to the outwardly tapering gap 151, the frictional element 144 expands radially outwardly. Due to the cut-outs 149, the frictional element 144 is free to expand out of the retaining cage 145 and come into contact with the internal surface of the guide bore 122a. This increases the friction between the guide bore 122a and the guide sleeve 128a and inhibits any further relative axial movement of the guide bore 122a and the guide sleeve 128a. In effect, this locks the caliper 102 relative to the carrier 101. When the lock arrangement 142 is released, the frictional element will return to its original shape.

Although a lock arrangement 142 is described with a friction element 144 that is deformed to create friction, in an alternative embodiment (not shown), the friction element 144 could instead be movable. In this alternative embodiment, instead of the axially movable element 147 deforming the friction element 144, the force applied can urge the friction element 144 in a radially outward direction in order to create friction between the guide sleeve 128a and the guide bore 122a. In some alternative embodiments, there could be a plurality of friction elements 144. For example, each friction element 144 could be a ball bearing axially located by one of the cut-outs 149. As the axially movable element 147 is axially moved relative to the guide sleeve 128a, each ball bearing is directed by the opposing angled surfaces of the axially movable element 147 and the axially fixed element 146 through one of the cut-outs and into contact with the internal surface of the guide bore 122a. When the lock arrangement 142 is released, the frictional element will return to its original position.

In a further alternative embodiment, rather than the axially fixed element 146 being fixed relative to the guide sleeve 128a, the axially fixed element 146 could be fixed relative to the guide bore 122a. In this embodiment, the axially movable element 147 could have a radially outer thread engaging a radially inner thread on the internal surface of the guide bore 122a, such that rotation of the axially movable element 147 causes relative axial movement of the axially movable element 147 and the internal surface of the guide bore 122a. In this embodiment, the retaining cage 145 would be reversed, as would be the direction of taper of the gap 151. The guide sleeve 128a would be free to slide relative to the lock arrangement 142, until the lock arrangement 142 was operated. When operated, the axially movable element 147 will apply a force to the frictional element 144 to cause it to come into contact with the guide sleeve 128a (e.g., by moving or deforming in the radial inward direction) and inhibit relative movement of the guide sleeve 128a and the guide bore 122a. In effect, this will lock the caliper 102 relative to the carrier 101.

More specifically, by "inhibit relative sliding between the guide pin 124a and the expandable element 144", it is meant that the forces that need to be applied to the brake carrier 101 and/or the caliper 102 to overcome the frictional forces between the frictional element 144 and the guide sleeve 128a of the guide pin 124a are greater than the forces exerted on the brake carrier 101 and/or the caliper 102 during normal operation, for example during cornering maneuvers.

The surface of the frictional element 144 which creates the friction may be provided with a high-friction texture or coating. For example, the surface of the frictional element 144 may include an array of protrusions which effectively increase the contact surface area between the expandable element 144 and the guide pin 124a.

In an intermediate configuration of the frictional element 144, the force applied may be such that full contact between the frictional element 144 and the guide bore internal surface might not be achieved. In this situation, frictional forces may be generated between the guide pin 124a and the frictional element 144 that are not sufficient to inhibit relative sliding between the guide pin 124a and the frictional element 144. Advantageously, in the intermediate configuration, the frictional element 144 may help to dampen relative motion between the caliper 102 and the brake carrier 101.

In alternative embodiments (not shown), the second guide assembly 112b may also include the lock arrangement 142. Operation of the disc brake assembly 100 and, specifically of the lock arrangement 142 will now be described.

During a braking operation, the lock arrangement 142 is in a configuration which does not inhibit the caliper 102 and the brake carrier 101 from sliding freely relative to each other. During the braking operation, as the actuation mechanism 122 moves the inboard brake pad 103a towards the rotor, the friction material 209a of the inboard brake pad 103a contacts the rotor. As the friction material 209a of the inboard brake pad 103a contacts the rotor, the inboard brake pad 103a will no longer advance. Instead, a reaction force passes through the inboard brake pad 103a and is transmitted to the caliper 102, causing the caliper 102 to slide relative to the brake carrier 101 in the inboard axial direction. The outboard brake pad 103b is engaged by the caliper 102, causing the outboard brake pad 103b to be moved in the direction of the rotor, and the friction material 209b of the outboard brake pad 103b to come into contact with the rotor, further restricting its rotation and slowing the vehicle.

After a braking operation, it is desired that the inboard brake pad 103a and the outboard brake pad 103b are moved away from the rotor completely, as any contact of the friction material 209a of the inboard brake pad 103a or the friction material 209b of the outboard brake pad 103b with the rotor will cause drag, leading to inefficiency of the vehicle due to the frictional forces that must be overcome to accelerate as well as premature wearing of the brake pads 103a, 103b and rotor, which must then be replaced earlier than otherwise necessary.

When the disc brake assembly 100 is no longer being actuated, the inboard brake pad 103a and the outboard brake pad 103b typically move away from the rotor due to the uneven surface of the rotor and low resistance of the first guide assembly 112a and second guide assembly 112b to sliding of the caliper 102, meaning only a small axial force is needed in order for the caliper 102 to slide relative to the brake carrier 101 in the opposite axial direction as during a braking operation.

The disc brake assembly 100 may include a positive pad retraction system (not shown), such as one or more positive pad retraction springs of a type known in the art interposed between the inboard brake pad 103a and the outboard brake pad 103b. Such positive pad retraction systems help ensure that the outboard brake pad assembly 103b is moved away from the rotor after a braking operation.

When the braking operation has ended and when the inboard brake pad 103a and the outboard brake pad 103b are spaced from the rotor, the lock arrangement 142 is operated to inhibit relative sliding between the caliper 102 and the carrier 101. As such, the positions of the inboard brake pad 103a and the outboard brake pad 103b remain substantially fixed relative to the rotor regardless of the forces exerted on the brake pads 103a, 103b during normal operation of the vehicle. Hence, outside of a braking operation, the brake pads 103a, 103b are inhibited from contacting the rotor.

Preferably, the lock arrangement 142 is operated to inhibit relative sliding between the caliper 102 and the carrier 101 only once the inboard brake pad 103a and the outboard brake pad 103b are located equidistant from the rotor. This helps to ensure that the brake pads 103a, 103b wear evenly over the lifetime of the brake pads 103a, 103b.

When a subsequent braking operation is initiated, the lock arrangement 142 is operated to allow the caliper 102 and the carrier 101 to slide freely relative to each other again.

In the lock arrangement 142, the actuator is self-locking. By self-locking it is meant that the actuating actuator can maintain the position of the axially movable element relative to the guide sleeve 128a without requiring electrical power.

In the event that the actuator 246 does not have a power supply, the disc brake assembly 100 is still able to perform a braking operation. This is because the frictional forces between the frictional element 144 and the guide sleeve 128a are less than the force applied by the actuation mechanism 122 to the inboard brake pad 103a during a braking operation. As such, the force applied by the actuation mechanism 122 to the inboard brake pad 103a is sufficient to overcome the frictional forces and move the caliper 102 relative to the brake carrier along the axial direction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
a caliper that has a guide bore;
a brake carrier arranged to receive a brake pad;
a guide pin comprising a guide sleeve secured to the brake carrier, the guide pin defining an axial direction and being received within the guide bore of the caliper, wherein the caliper is slidable relative to the brake carrier along the guide sleeve; and
a lock arrangement at least partially interposed between the guide bore and the guide sleeve, the lock arrangement comprising a friction element, wherein the lock arrangement is operable to selectively apply a force to the friction element to increase friction between the guide sleeve and the guide bore and inhibit relative sliding between the caliper and the brake carrier in the axial direction when a braking operation has ended and the brake pad is spaced apart from a rotor,
wherein the friction element is configured to be deformed by the force applied by the lock arrangement, wherein the friction element is configured to be compressed in the axial direction and expanded in a radial direction by the force applied by the lock arrangement.

2. The brake assembly of claim 1 wherein the friction element has a cross-sectional area, and the cross-sectional area remains constant as the friction element is deformed.

3. The brake assembly of claim 1 wherein the lock arrangement comprises a retaining cage that houses the friction element, wherein the retaining cage further comprises an axially fixed element and an axially movable element, wherein the friction element is located between the axially fixed element and the axially movable element, and wherein when the lock arrangement is operated, the axially movable element is moved towards the axially fixed element to apply the force to the friction element.

4. The brake assembly of claim 3 wherein the retaining cage, the axially movable element, the axially fixed element, and the friction element are all annular.

5. The brake assembly of claim 4 wherein the axially movable element has a radially inner thread that engages a radially outer thread of the guide sleeve, wherein rotation of the axially movable element results in movement of the axially movable element relative to the guide sleeve.

6. The brake assembly of claim 3 wherein the axially fixed element is axially fixed relative to the guide sleeve.

7. The brake assembly of claim 3 wherein the retaining cage has a low-friction radially outer surface.

8. The brake assembly claim 3 wherein the retaining cage comprises one or more cut-outs to enable the friction element to expand radially outwardly through the one or more cut-outs.

9. The brake assembly of claim 8 wherein the retaining cage comprises at least two circumferentially distributed cut-outs.

10. The brake assembly of claim 3 wherein a gap is defined between the axially fixed element and the axially movable element, wherein the gap locates the frictional element, and the axially fixed element and the axially movable element have opposing angled end faces and the gap tapers outwardly in a radially outward direction.

11. The brake assembly of claim 1 wherein the friction element is an annular resilient element.

12. The brake assembly of claim 11 wherein the annular resilient element is an o-ring.

13. The brake assembly of claim 1 wherein the friction element is configured to be moved in a radial direction by the force applied by the lock arrangement.

14. The brake assembly of claim 13 wherein the lock arrangement comprises a retaining cage that houses the friction element, wherein the retaining cage further comprises an axially fixed element and an axially movable element, wherein the friction element is located between the axially fixed element and the axially movable element, and wherein when the lock arrangement is operated, the axially movable element is moved towards the axially fixed element to apply the force to the friction element.

15. The brake assembly of claim 14 wherein the retaining cage comprises one or more cut-outs to retain the friction element and allow the friction element to move radially outwardly through the one or more cut-outs.

16. The brake assembly of claim 14 wherein the lock arrangement comprises a plurality of friction elements distributed circumferentially, and the retaining cage comprises a plurality of circumferentially distributed cut-outs that correspond to the plurality of friction elements, and opposing angled end faces of the axially fixed element and the axially movable element direct the friction elements through the cut-outs and into contact with an inner surface of the guide bore when the lock arrangement is operated.

17. The brake assembly of claim 16 wherein each friction element is a ball bearing.

18. A brake assembly comprising:
a caliper that has a guide bore;
a brake carrier arranged to receive a brake pad;
a guide pin comprising a guide sleeve secured to the brake carrier, the guide pin defining an axial direction and being received within the guide bore of the caliper, wherein the caliper is slidable relative to the brake carrier along the guide sleeve; and
a lock arrangement at least partially interposed between the guide bore and the guide sleeve, the lock arrangement comprising a friction element, wherein the lock arrangement comprises a retaining cage disposed adjacent to the friction element, wherein the retaining cage further comprises an axially fixed element and an axially movable element, wherein the friction element is located between the axially fixed element and the axially movable element;
wherein the lock arrangement is operable to selectively apply a force to the friction element to increase friction between the guide sleeve and the guide bore and inhibit relative sliding between the caliper and the brake carrier, wherein when the lock arrangement is operated, the axially movable element is moved towards the axially fixed element to apply the force to the friction element; and
wherein the friction element is configured to be deformed by the force applied by the lock arrangement, wherein the friction element is configured to be compressed in the axial direction and expanded in a radial direction by the force applied by the lock arrangement.

19. A brake assembly comprising:
a caliper that has a guide bore;
a brake carrier arranged to receive a brake pad;

a guide pin comprising a guide sleeve secured to the brake carrier, the guide pin defining an axial direction and being received within the guide bore of the caliper, wherein the caliper is slidable relative to the brake carrier along the guide sleeve; and a lock arrangement at least partially interposed between the guide bore and the guide sleeve, the lock arrangement comprising a friction element;

wherein the lock arrangement is operable to selectively apply a force to the friction element to increase friction between the guide sleeve and the guide bore and inhibit relative sliding between the caliper and the brake carrier in the axial direction when a braking operation has ended and the brake pad is spaced apart from a rotor; and wherein the friction element is configured to be moved in a radial direction by the force applied by the lock arrangement.

* * * * *